United States Patent
Lomax, Jr.

(10) Patent No.: US 6,699,307 B1
(45) Date of Patent: Mar. 2, 2004

(54) HIGH RECOVERY PSA CYCLES AND APPARATUS WITH REDUCED COMPLEXITY

(75) Inventor: Franklin D. Lomax, Jr., Arlington, VA (US)

(73) Assignee: H2gen Innovations, Inc., Alexandria, VA (US)

(*) Notice: Subject to any disclaimer, the term of this patent is extended or adjusted under 35 U.S.C. 154(b) by 0 days.

(21) Appl. No.: 10/269,064

(22) Filed: Oct. 11, 2002

(51) Int. Cl.$^7$ ............................................. B01D 53/047
(52) U.S. Cl. ............................ 95/97; 95/104; 95/130; 96/130; 96/144
(58) Field of Search ................. 95/96–98, 100–105, 95/130; 96/130, 143, 144

(56) References Cited

U.S. PATENT DOCUMENTS

| | | | | | |
|---|---|---|---|---|---|
| 3,176,444 A | * | 4/1965 | Kiyonaga | ....................... | 95/96 |
| 3,430,418 A | | 3/1969 | Wagner | | |
| 3,564,816 A | | 2/1971 | Batta | | |
| 3,636,679 A | * | 1/1972 | Batta | ........................... | 95/100 |
| 3,986,849 A | | 10/1976 | Fuderer et al. | | |
| 4,129,424 A | * | 12/1978 | Armond | ........................ | 95/98 |
| 4,234,322 A | * | 11/1980 | De Meyer et al. | .............. | 95/19 |
| 4,315,759 A | * | 2/1982 | Benkmann | ...................... | 95/23 |
| 4,359,328 A | * | 11/1982 | Wilson | ............................ | 95/98 |
| 4,371,380 A | * | 2/1983 | Benkmann | ...................... | 95/97 |
| 4,498,910 A | * | 2/1985 | Benkmann | ................... | 95/100 |
| 4,578,089 A | * | 3/1986 | Richter et al. | ................. | 95/101 |
| 4,640,694 A | * | 2/1987 | Leitgeb et al. | ................. | 95/100 |
| 4,661,125 A | * | 4/1987 | Haruna et al. | ................. | 95/102 |
| 4,684,377 A | * | 8/1987 | Haruna et al. | ................. | 95/102 |
| 4,761,165 A | | 8/1988 | Stocker et al. | | |
| 4,775,394 A | * | 10/1988 | Yamano et al. | ................ | 95/101 |
| 4,781,735 A | * | 11/1988 | Tagawa et al. | ................ | 95/101 |
| 5,015,271 A | * | 5/1991 | Reiss | .............................. | 95/26 |
| 5,015,272 A | * | 5/1991 | Okada et al. | ................... | 95/26 |
| 5,084,075 A | * | 1/1992 | Sircar | ............................. | 95/26 |
| 5,248,322 A | * | 9/1993 | Kumar | .......................... | 95/101 |
| 5,258,059 A | * | 11/1993 | Yamaguchi et al. | ........... | 95/100 |
| 5,411,578 A | * | 5/1995 | Watson et al. | ................. | 95/101 |
| 5,540,758 A | * | 7/1996 | Agrawal et al. | ............... | 95/101 |
| 5,560,763 A | * | 10/1996 | Kumar | ............................ | 95/98 |
| 5,656,067 A | * | 8/1997 | Watson et al. | ................. | 95/101 |
| 5,704,964 A | * | 1/1998 | Kaneko et al. | ................. | 95/23 |
| 5,964,924 A | * | 10/1999 | Engler et al. | .................. | 95/98 |
| 5,997,612 A | * | 12/1999 | Doong | .......................... | 95/101 |
| 6,017,382 A | * | 1/2000 | Ji et al. | ......................... | 95/103 |
| 6,048,384 A | * | 4/2000 | Smolarek | ........................ | 95/98 |
| 6,063,161 A | * | 5/2000 | Keefer et al. | .................. | 95/100 |
| 6,146,450 A | | 11/2000 | Duhayer et al. | | |
| 6,210,466 B1 | * | 4/2001 | Whysall et al. | ................ | 95/100 |
| 6,224,651 B1 | * | 5/2001 | Monereau et al. | ............. | 95/19 |
| 6,428,607 B1 | * | 8/2002 | Xu et al. | ....................... | 95/101 |
| 6,447,582 B1 | * | 9/2002 | de Souza | ...................... | 96/121 |
| 6,461,410 B1 | * | 10/2002 | Abe et al. | ....................... | 95/97 |
| 6,503,299 B2 | * | 1/2003 | Baksh et al. | .................... | 95/98 |
| 6,506,234 B1 | * | 1/2003 | Ackley et al. | ................... | 95/96 |
| 6,527,831 B2 | * | 3/2003 | Baksh et al. | .................. | 95/100 |
| 2002/0029691 A1 | * | 3/2002 | McCombs et al. | ............. | 95/96 |
| 2002/0139246 A1 | * | 10/2002 | Kumar et al. | .................. | 95/98 |

* cited by examiner

Primary Examiner—Robert H. Spitzer
(74) Attorney, Agent, or Firm—Oblon, Spivak, McClelland, Maier & Neustadt, P.C.

(57) ABSTRACT

A pressure swing adsorption process including the step of separating a gas mixture by absorbing a gas component in adsorbent beds provided within vessels, where the separating step has at least a two-stage pressure equalization and is performed with no more than five valves per vessel of the plurality of vessels. The process includes an adsorption step, a first pressure equalization step having at least two stages where the pressure decreases, a purge step, and a second pressure equalization step having at least two stages where the pressure increases. A pressure swing adsorption system is provided with vessels each having a first opening connected to a source manifold via a fist valve and connected to a waste manifold via a second valve, and a second opening connected to a product manifold via a third valve and connected to an equalization conduit via a fourth valve and a fifth valve.

55 Claims, 9 Drawing Sheets

Figure 1

| VESSEL | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 10 | | A | | | | | E1D | | PP | | | E2D | BD | | P | | | E2P | E1P | | FP | | | |
| 20 | BD | | P | | | E2P | E1P | | | FP | | | E2P | E1P | | | A | | E1D | | PP | | | E2D |
| 30 | E1D | | PP | | | E2D | BD | | | P | | | | E1D | | | FP | | | A | | | P | |
| 40 | E1P | | | FP | | | | A | | | | | | | | | PP | E2D | BD | | | P | | E2P |

FIG. 3

| ADSORBER | 1 | 2 | 3 | 4 | 5 | 6 | 7 | 8 | 9 | 10 | 11 | 12 | 13 | 14 | 15 | 16 | 17 | 18 | 19 | 20 | TIME UNIT |
|---|---|---|---|---|---|---|---|---|---|---|---|---|---|---|---|---|---|---|---|---|---|
| 10 | E1D | E2D | PP | | BD | H | P | PP | H | E2P | H | P | E1P | H | FP | H | P | EP | H | A | |
| 20 | A | | | E1D | E2D | | | | BD | H | P | PP | H | E2P | H | P | EP | H | FP | | |
| 30 | E1P | FP | | | E1P | H | A | FP | E1P | H | A | FP | H | E2D | P | PP | H | E2P | H | P | PP |
| 40 | H | E2P | H | P | H | E2P | H | | BD | E1D | E2D | PP | BD | H | P | PP | H | E2P | H | P | PP |
| 50 | BD | H | P | PP | H | | | | E1D | E2D | A | | E1D | E2D | A | | E1D | E2D | A | PP | |

FIG. 5

| ADSORBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | TIME UNIT |
|---|---|---|---|---|---|---|---|---|---|---|---|---|---|---|---|---|---|---|---|---|---|---|---|---|---|
| 10 | A | A | A | A | A | A | E1D | E2D | E3D | PP | BD | H | H | H | H | H | E3P | H | H | E2P | H | H | E1P | FP | |
| 20 | H | E1P | FP | | E2P | H | H | H | H | H | H | E2D | E3D | PP | BD | H | H | P | H | H | E3P | H | H | E2P | |
| 30 | E3P | H | H | E2P | H | H | E1P | FP | | A | A | A | A | A | A | E1D | E2D | E3D | PP | BD | H | H | P | H | |
| 40 | H | P | H | H | E3P | H | H | E2P | H | H | E1P | FP | | A | A | A | A | A | A | E1D | E2D | E3D | BD | H | |
| 50 | E3D | PP | BD | H | H | P | H | H | E3P | H | H | E2P | H | H | E1P | FP | | A | A | A | A | A | A | E1D | |
| 60 | A | A | A | E1D | E2D | E3D | PP | BD | H | H | P | H | H | E3P | H | H | E2P | H | H | E1P | FP | | A | A | |

FIG. 7

| ADSORBER | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 10 | E1P | FP | FP | A | A | A | E1D | E2D | E2D | E3D | PP | PP | BD | P | P | E3P | E2P | E2P | E1P | FP | FP |
| 20 | E3P | E2P | E2P | E1P | FP | FP | A | A | A | E1D | E2D | E2D | E3D | PP | PP | BD | P | P | E3P | E2P | E2P |
| 30 | BD | P | P | E3P | E2P | E2P | E1P | FP | FP | A | A | A | E1D | E2D | E2D | E3D | PP | PP | BD | P | P |
| 40 | E3D | PP | PP | BD | P | P | E3P | E2P | E2P | E1P | FP | FP | A | A | A | E3D | PP | PP | E3D | PP | PP |
| 50 | E1D | E2D | E2D | E3D | PP | PP | BD | P | P | E3P | E2P | E2P | E1P | FP | FP | E1D | E2D | E2D | E1D | E2D | E2D |
| 60 | A | A | A | E1D | E2D | E2D | E3D | PP | PP | BD | P | P | E3P | E2P | E2P | A | A | A | A | A | A |
| 70 | A | A | A | A | A | A | A | A | A | A | A | A | A | A | A | E1P | FP | FP | A | A | A |

TIME UNIT

HIGH RECOVERY PSA CYCLES AND APPARATUS WITH REDUCED COMPLEXITY

BACKGROUND OF THE INVENTION

1. Field of the Invention

The present invention relates to pressure swing adsorption systems and processes for performing pressure swing adsorption.

2. Discussion of the Background

Pressure Swing Adsorption (PSA) is a technique used to fractionate mixtures of gases to provide at least one purified product gas and a raffinate byproduct mixture. PSA has been successfully used to separate hydrogen from other gases, oxygen and nitrogen from air, helium from natural gas, among others.

Early PSA systems generally used four adsorbent vessels operated in parallel. An example of this is U.S. Pat. No. 3,430,418 to Wagner. Later improvements to Wagner's process added an additional pressure equalization step while retaining four adsorbent beds (e.g., U.S. Pat. No. 3,564,816 to Batta) and subsequently added even more pressure equalization steps to seven or more beds in U.S. Pat. No. 3,986,849 to Fuderer et al. These increases in the number of pressure equalizations and the number of adsorbent vessels were implemented to increase the product recovery and the adsorbent productivity. Unfortunately, the increases in performance were accompanied by an increase in the number of valves required from thirty-one for the Wagner process to thirty-three for the Batta process to a minimum of forty-four for the Fuderer et al process.

The performance of PSA cycles is commonly measured based upon several criteria. The first is product recovery at a given impurity level the fraction of the product species in the total feed stream that is delivered as purified product. A second measure is the productivity of the adsorbent, which is related to the proportion of the PSA cycle during which product is delivered compared to the total length of the cycle. In order to maximize one or both of these parameters at fixed feed compositions, a number of approaches have been described in other systems.

Wagner describes the use of gas stored in the pressurized beds to repressurize one other vessel which bad been purged, then to subsequently purge another vessel before the pressure in the first vessel was depleted. Batta subsequently describes that a second pressure equalization could be added to the first and that this would improve recovery meaningfully. Batta retained the provision of purge gas in his cycle. Fuderer et al. extended this approach to a third pressure equalization, and taught that the purest gas withdrawn from a bed should always be the last gas admitted to any other bed being repressurized. Batta's four vessel cycle was constituted such that less pure gas was admitted to the vessel being pressurized than was truly desirable. Further, Fuderer et al.'s invention allowed for a higher adsorbent productivity than was achievable with previous cycles, because the fraction of time in the cycle allocated to adsorption was higher due to the details of the valve switching logic.

Although these methods facilitate excellent product recovery and adsorbent productivity, they do so at the expense of a high degree of complexity. Wagner's original process employed four vessels and thirty-one valves to facilitate one pressure equalization, and purging of one other vessel Batta increased this total to thirty-three valves and four vessels for his cycle with two equalizations. Both of these four bed cycles produce gas from a given vessel twenty-five percent of the time. Batta also provided a five vessel system with forty-three valves to reorder the equalizations to provide the desired repressurization with gases increasing continuously in purity. This cycle produced from a given vessel only twenty percent of the time. Fuderer et al.'s most simple cycle providing three equalizations and a purging step required nine vessels and fifty-five valves. This cycle produced thirty-three percent of the time, a significant increase over the cycles of Batta and Wagner. Although these cycles progressed in the critical areas of recovery and productivity, they did so at the expense of much increased mechanical complexity. This increase in complexity is accompanied by increases in system volume, mass, assembly time, and capital cost. Furthermore, the large increase in the number of valves over time significantly reduces the reliability of the PSA system; as such PSA systems are single point of failure systems, which must be shut down even if one valve fails.

Efforts have been made to reduce complexity in order to address its attendant problem U.S. Pat. No. 4,761,165 to St ocker implemented the process of Wagner using four vessels and eighteen valves, of which four could be proportionally-controlled valves. U.S. Pat. No. 6,146,450 to Duhayer et al. describes a means for reducing complexity by arranging pipe fittings optimally, although this approach does not materially alter the PSA cycle in terms of valve or vessel count Much more dramatic mechanical simplification has been described in an application entitled METHOD AND APPARATUS FOR PRESSURE SWING ADSORPTION by inventor Franklin D. Lomax, Jr. et al. filed concurrently herewith that is based upon Provisional Application Ser. No. 60/370,702, entitled IMPROVED METHOD AND APPARATUS FOR PRESSURE SWING ADSORPTION, which was filed on Apr. 9, 2002.

Although Stöcker's process does attain meaningful simplification in the number of valves used relative to the process of Wagner, he does not reveal means for accomplishing a second or third pressure equalization to increase recovery, nor does he describe an increase in adsorbent productivity. The mechanical simplifications of both Duhayer et al. and Lomax et al. offer advantages for virtually any PSA cycle, and do not specifically teach any inherent reduction in valve count or changes in cycles to achieve increased recovery or adsorbent productivity without the attendant increases in valve and vessel usage taught by Batta, Fuderer et al. and others. Furthermore, none of these improvements fundamentally alter the reliability of the PSA cycles, as the basic cycles remain single point of failure systems.

SUMMARY OF THE INVENTION

The present invention advantageously provides improved PSA operating cycles that reduce the complexity of the PSA equipment Additionally, the present invention advantageously provides a general method for simplifying PSA cycles to optimize product recovery and adsorbent productivity, while simultaneously reducing mechanical complexity, by employing parallel equalization fluid conduits.

The present invention advantageously provides a method for operating improved PSA cycles in a fault-tolerant manner, where a single valve failure does not require system shutdown.

The present invention advantageously provides a pressure swing adsorption process including the step of separating a gas mixture by absorbing at least one gas component in adsorbent beds provided within a plurality of vessels, where the separating step has at east a two-stage pressure equalization and is performed with no snore than five valves per vessel of the plurality of vessels.

The present invention further advantageously provides a pressure swing adsorption process for separating a gas mixture by absorbing at least one gas component in adsorbent beds provided within a plurality of vessels, where the plurality of vessels are cyclically operated. The process includes an adsorption step, a first pressure equalization step having at least two stages where the first pressure equalization step decreases pressure, a purge step, and a second pressure equalization step having at least two stages where the second pressure equalization step increases pressure. The process is performed with no more than five valves per vessel of the plurality of vessels.

The present application also advantageously provides a pressure swing adsorption system including a plurality of vessels each having a first opening connected to a source inlet manifold via a first valve and connected to a waste outlet manifold via a second valve, and a second opening connected to a product outlet manifold via a third valve and connected to an equalization conduit via a fourth valve and a fifth valve. The equalization conduit connects each vessel of the plurality of vessels.

Furthermore, the present application advantageously provides a pressure swing adsorption system including a plurality of vessels each having a first opening connected to a source inlet manifold via a first valve and connected to a waste outlet manifold via a second valve, and a second opening connected to a product outlet manifold via a third valve and connected to an equalization conduit via a fourth valve and a fifth valve. The equalization conduit connects each vessel of the plurality of vessels. The fourth valve provides a first predetermined flow rate when in an open state, and the fifth valve provides a second predetermined flow rate when in an open state.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 1 depicts a cycle diagram for a four vessel pressure swing adsorption (PSA) cycle including a two-stage pressure equalization;

FIG. 3 depicts a cycle diagram for a five vessel PSA cycle including a two-stage pressure equalization;

FIG. 5 depicts a cycle diagram for a six vessel PSA cycle including a three-stage pressure equalization;

FIG. 7 depicts a cycle diagram for a seven vessel PSA cycle including a three-stage pressure equalization;

DETAILED DESCRIPTION OF THE INVENTION

Figure 2:
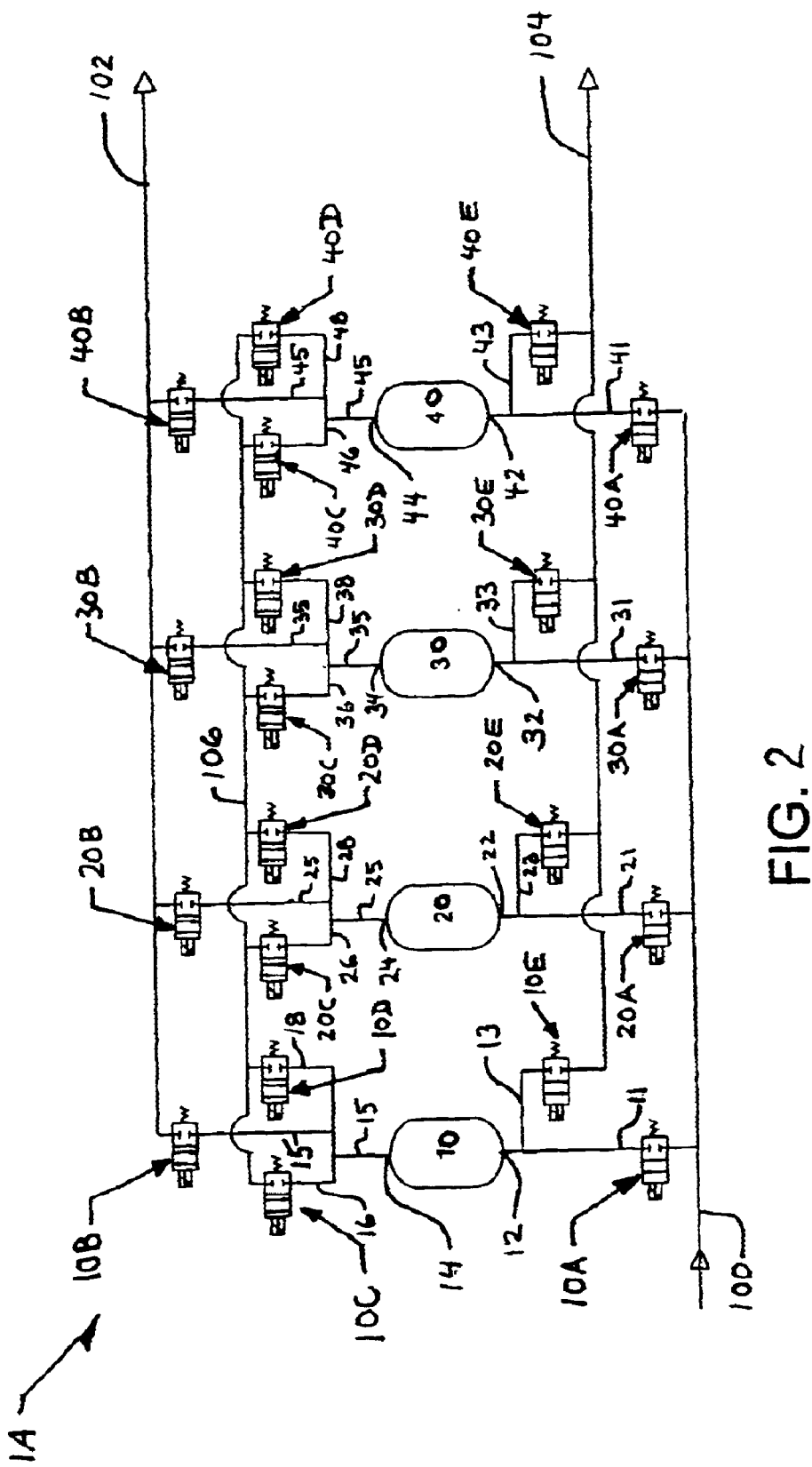
FIG. 2 depicts a valve diagram of an improved PSA system for executing the four vessel PSA cycle of FIG. 1.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 depicts a cycle diagram for a four vessel pressure swing adsorption (PSA) cycle including a two-stage pressure equalization. FIG. 2 depicts a valve diagram of an improved PSA system 1A that can be used to execute the four vessel PSA cycle depicted in FIG. 1.

FIG. 2 depicts a PSA system 1A that includes a first vessel 10, a second vessel 20, a third vessel 30, and a fourth vessel 40. Each of the vessels typically includes a bed of adsorption material. The vessels 10, 20, 30, and 40 are connected in parallel flow relation between a source manifold 100, which supplies a feed gas mixture, and a product manifold 102, which provides an outlet for unabsorbed product effluent gas. The vessels 10, 20, 30, and 40 are also connected to a waste manifold 104, which provides an outlet for adsorbed components.

Each of the vessels 10, 20, 30, and 40 has a lower opening 12, 22, 32, and 42, respectively, on a lower end thereof. The lower openings 12, 22, 32, and 42 are connected to the source manifold 100 via conduits 11, 21, 31, and 41, respectfully. The conduits 11, 21, 31, and 41 have valves 10A, 20A, 30A, and 40A, respectively, which control the flow of fluid between the source manifold 100 and the respective vessels 10, 20, 30, and 40. The lower opening 12, 22, 32, and 42 are connected to the waste manifold 104 via conduits 13, 23, 33, and 43, respectfully. The conduits 13, 23, 33, and 43 have valves 10E, 20F, 30E, and 40E, respectively, which control the flow of fluid between the waste manifold 104 and the respective vessels 10, 20, 30, and 40.

Additionally, each of the vessels 10, 20, 30, and 40 has an upper opening 14, 24, 34, and 44, respectively, on an upper end thereof. The upper openings 14, 24, 34, and 44 are connected to the product manifold 102 via conduits 15, 25, 35, and 45, respectfully. The conduits 15, 25, 35, and 45 have valves 10B, 20B, 30B, and 40B, respectively, which control the flow of fluid between the product manifold 102 and the respective vessels 10, 20, 30, and 40.

The upper openings 14, 24, 34, and 44 can be connected to the equalization conduit 106 by one or more conduits, with each conduit having a valve therein. Preferably, the upper opening 14 of the vessel 10 is connected to the equalization conduit 106 via a first conduit 16 and a second conduit 18. The conduits 16 and 18 have valves 10C and 10D, respectively, which control the flow of fluid between the equalization conduit 106 and the vessel 10. The valves 10C and 10D arc configured to provide a predetermined flow rate when in an open state, and preferably the valves 10C and 10D are configured to provide different predetermined flow rates. Accordingly, during a two-stage pressure equalization where fluid is flowing from the equalization conduit 106 (from one of the other vessels 20, 30, and 40) into vessel 10, one of the valves can be configured to open at a first predetermined flow rate that is appropriate during the first stage to achieve the desired equalization, and then the other valve (with the other valve closing or both valves open) can be configured to open at a second predetermined flow rate that us appropriate during the second stage to achieve the desired equalization without detrimental fluid shock within the vessels and the system that may occur if large pressure differentials and large flow rate changes occur in the systems. Alternatively, the PSA system of the present invention can include a single conduit and valve connecting each vessel with the equalization conduit 106, or three or more conduits and valves can be used to connect each vessel with the equalization conduit 106 depending upon the flow characteristics desired in the PSA system. The valves of the PSA system 1A can be manually controlled, automatically controlled by a control system, automatically actuated based upon operating conditions, such as a predetermined pressure level, or some combination thereof. The valves can be variable flow rate valves, if desired.

Preferably, the upper openings 24, 34, and 44 of the vessels 20, 30 and 40 are connected to the equalization conduit 106 in a similar manner as described above for the upper opening 14 of vessel 10. More specifically, the upper opening 24 of vessel 20 is connected to the equalization conduit 106 via a first conduit 26 and a second conduit 28, and the conduits 26 and 28 have valves 20C and 20D, respectively, which control the flow of fluid between the equalization conduit 106 and the vessel 20. Additionally, the upper opening 34 of vessel 30 is connected to the equalization conduit 106 via a first conduit 36 and a second conduit 38, and the conduits 36 and 38 have valves 30C and 30D, respectively, which control the flow of fluid between the equalization conduit 106 and the vessel 30. Furthermore, the upper opening 44 of vessel 40 is connected to the equalization conduit 106 via a first conduit 46 and a second conduit 48, and the conduits 46 and 48 have valves 40C and 40D, respectively, which control the flow of fluid between the equalization conduit 106 and the vessel 40.

Preferably, the valves 10C, 10D, 20C, 20D, 30C, 30D, 40C, and 40D do not prevent flow along the equalization conduit 106.

FIG. 1 depicts a cycle diagram for a four vessel pressure swing adsorption (PSA) cycle including a two-stage pressure equalization that can be executed by the PSA system 1A depicted in FIG. 2. The PSA cycle depicted in FIG. 1 has been divided into twenty-four time units for simplicity of discussion. Each of the four adsorption vessels 10, 20, 30, and 40 follow the same sequence of steps, however, each vessel's sequence of steps are offset from the other vessels. Below is a description of the cycle of adsorption vessel 10.

During time unit 1, adsorption vessel 10 is performing an adsorption process (A) with valves 10A and 10B in an open state and valves 10C, 10D, 10E, 20A, 30A, 40A, 20B, 30B, and 40B in a closed state. During time unit 1, feed gas mixture fluid is being supplied from the source manifold 100 via conduit 11 to the opening 12 of the vessel 10, the fluid is traveling through the adsorption bed within vessel 10, and unadsorbed product fluid is exiting out opening 14 and traveling via conduit 15 to the product manifold 102.

During time units 2 through 6, valves 10A and 10B remain in the open state such that adsorption vessel 10 continues to perform the adsorption process (A), and valve 40B is moved into an open state to perform a final product repressurization step (FP) in vessel 40. During the final product repressurization, fluid flows from the product manifold 102 along conduit 45, and through opening 44 into vessel 40.

During time units 7, valves 10A and 10B close and valves 10C and 20C are moved into an open state to allow the pressures within vessels 10 and 20 to equalize. (For purposes of simplicity in the description valves 10C and 20C have been described rein as being used during the pressure equalization step, but note that alternatively valves 10D and 20D can be used, or valves 10C and 20D, or valves 10D and 20C.) During time unit 7, the vessel 10 performs a first stage pressure equalization step (E1D) where pressure in the vessel 10 is decreasing, and simultaneously the vessel 20 performs a first stage pressure equalization step (E1P) where press in the vessel 20 is increasing. During time unit 7, fluid from within vessel 10 flows out opening 14 and along conduit 16 to the equalization conduit 106, and then along conduit 26 and into the vessel 20 through opening 24.

During time units 8 through 11, valve 20C is moved into a closed state and valve 30C (or valve 30D) is moved into an open state. During time units 8 through 11, the vessel 10 performs a cocurrent depressurization step (PP) by providing purge gas to vessel 30, which purges (P) waste by opening valve 30E and thereby discharging the waste from vessel 30 to waste manifold 104 via conduit 33. During time units 8 through 11, fluid from within vessel 10 flows out opening 14 and along conduit 16 to the equalization conduit 106, and then along conduit 36 and into the vessel 30 through opening 34. The vessel 30 is purged by fluid exiting through opening 32 and traveling along conduit 33 to the waste manifold 104.

During time unit 12, vessel 10 continues to supply fluid to vessel 30; however, valve 30E is moved into a closed state to allow the pressures within vessels 10 and 30 to equalize. During time unit 12, the vessel 10 performs a second stage pressure equalization step (E2D) where pressure in the vessel 10 is decreasing, and simultaneously the vessel 30 performs a second stage pressure equalization step (E2P) where pressure in the vessel 30 is increasing Note that during time unit 12, the second pressure equalization step can be performed using valves 10D and 30D, which can provide a different flow rate than valves 10C and 30C. Accordingly, during time unit 12, valves 10C and 30C are closed and valves 10D and 30D are moved into open states. Therefore, during time unit 12, fluid from within vessel 10 flows out opening 14 and along conduit 18 to the equalization conduit 106, and then along conduit 38 and into the vessel 30 through opening 34.

During time unit 13, the valve 10D is closed and the valve 10E is moved into an open state. During time unit 13, the vessel 10 performs a countercurrent blowdown step (BD) in which fluid from within the vessel 10 exits through opening 12 and travels along conduit 13 to the waste manifold 104.

During time units 14 through 17, the valve 10E remains in the open state and valves 10D and 40D (or 10C and 40C, depending on the desired flow rate) are moved into the open state, while valves 20C, 20D, 30C, and 30D are closed. During time units 14 through 17, the vessel 40 performs a cocurrent depressurization (PP) by providing purge gas to vessel 10, which purges (P) waste through opening valve 10E and thereby discharging the waste from vessel 10 to waste manifold 104 via conduit 13. During time units 14 through 17, fluid from within vessel 40 flows out opening 44 and along conduit 48 to the equalization conduit 106, and then along conduit 18 and into the vessel 10 through opening 14. The vessel 10 is purged by fluid exiting through opening 12 and traveling along conduit 13 to the waste manifold 104.

During time unit 18, vessel 40 continues to supply fluid to vessel 10; however, valve 10E is moved into a closed state to allow the pressures within vessels 10 and 40 to equalize. During time unit 18, the vessel 40 performs a second stage pressure equalization step (E2D) where pressure in the vessel 40 is decreasing, and simultaneously the vessel 10 performs a second stage pressure equalization step (E2P)

where pressure in the vessel 10 is increasing. During time unit 18, the second pressure equalization step is performed using valves 10D and 40D. Accordingly, during time unit 18, valves 10D and 40D are in open states. Therefore, during time unit 18, fluid from within vessel 40 flows out opening 44 and along conduit 48 to the equalization conduit 106, and then along conduit 18 and into the vessel 10 through opening 14.

During time unit 19, valves 10D and 40D are closed and valves 10C and 20C are moved into an open state to allow the pressures within vessels 10 and 20 to equalize. During time unit 19, the vessel 20 performs a first stage pressure equalization step (E1D) where pressure in the vessel 20 is decreasing, and simultaneously the vessel 10 performs a first stage pressure equalization step (E1P) where pressure in the vessel 10 is increasing During time unit 19, fluid from within vessel 20 flows out opening 24 and along conduit 26 to the equalization conduit 106, and then along conduit 16 and into the vessel 10 through opening 14.

During time units 20 through 24, valves 10C and 20C are closed, and valve 10B is moved into an open state to perform a final product repressurization step (FP) in vessel 10. During the final product repressurization step (FP), fluid flows from the vessel 30, which is currently performing the adsorption step, to the product manifold 102 via conduit 35, and then from the product manifold 102 along conduit 15 and through opening 14 into vessel 10.

The remaining adsorption vessels 20, 30, and 40 follow the same sequence of steps, however, each the sequence of steps are offset from the other vessels. The processes for each of the remaining adsorption vessels 20, 30, and 40 are similar to that described above with regards to vessel 10; however, the various steps that require interaction between vessels will be performed using different vessels as specified in the PSA cycle diagram clearly set forth in FIG. 1.

Figure 4:
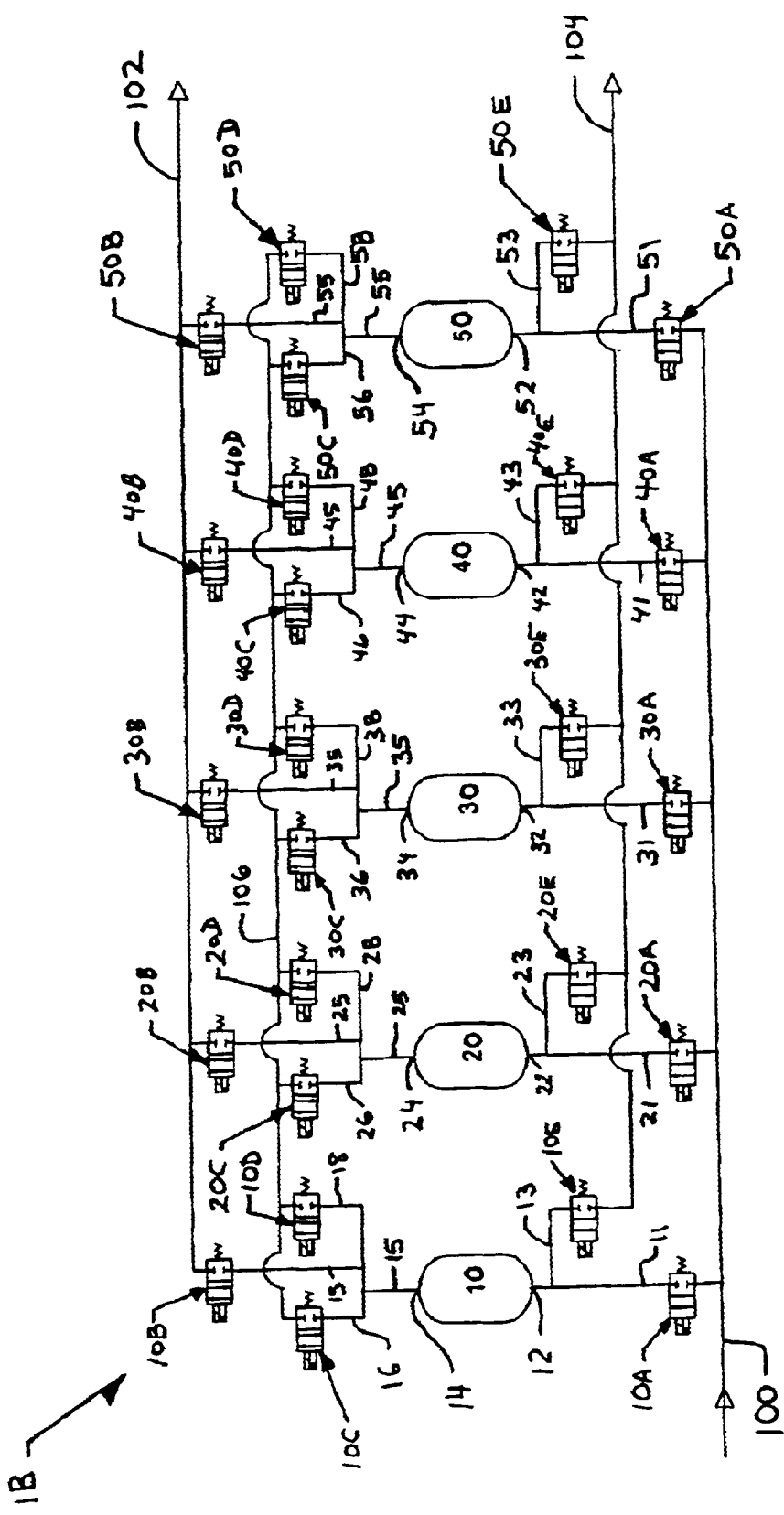
FIG. 4 depicts a valve diagram of an improved PSA system for executing the five vessel PSA cycle of FIG. 3.

FIG. 3 depicts a cycle diagram for a five vessel pressure swing adsorption (PSA) cycle including a two-stage pressure equalization. FIG. 4 depicts a valve diagram of an improved PSA system 1B that can be used to execute the five vessel PSA cycle depicted in FIG. 3.

FIG. 4 depicts a PSA system 1B that includes a first vessel 10, a second vessel 20, a third vessel 30, and a fourth vessel 40, with corresponding valves and conduits as described above in the four vessel PSA system 1A, which, for purposes of simplicity, will not be described in detail again. The PSA system 1B also includes a fifth vessel 50 that includes a bed of adsorption material therein. The vessels 10, 20, 30, 40, and 50 are connected in parallel flow relation between a source manifold 100, which supplies a feed gas mixture, and a product manifold 102, which provides an outlet for unabsorbed product effluent gas. The vessels 10, 20, 30, 40, and 50 are also connected to a waste manifold 104, which provides an outlet for adsorbed components.

The vessel 50 has a lower opening 52 on a lower end thereof that is connected to the source manifold 100 via conduit 51. The conduit 51 has a valve 50A, which controls the flow of fluid between the source manifold 100 and the vessel 50. The lower opening 52 is connected to the waste manifold 104 via conduit 53. The conduit 53 has a valve 50E, which controls the flow of fluid between the waste manifold 104 and the vessel 50. Additionally, the vessel 50 has an upper opening 54 on an upper end thereof, which is connected to the product manifold 102 via conduit 55. The conduit 55 has a valve 50B, which controls the flow of fluid between the product manifold 102 and the vessel 50.

The upper opening 54 can be connected to the equalization conduit 106 by one or more conduits, with each conduit having a valve therein. Preferably, the upper opening 54 of the vessel 50 is connected to the equalization conduit 106 via a first conduit 56 and a second conduit 58. The conduits 56 and 58 have valves 50C and 50D, respectively, which control the flow of fluid between the equalization conduit 106 and the vessel 50. The valves 50C and 50D are configured to operate in the same manner as valves 10C and 10D described about with respect to the four vessel PSA system 1A. Alternatively, the PSA system of the present invention can include a single conduit and valve connecting each vessel with the equalization conduit 106, or three or more conduits and valves can be used to connect each vessel with the equalization conduit 106 depending upon the flow characteristics desired in the PSA system.

FIG. 3 depicts a cycle diagram for a five vessel pressure swing adsorption (PSA) cycle including a two-stage pressure equalization that can be executed by the PSA system 1B depicted in FIG. 4. The PSA cycle depicted in FIG. 3 has been divided into twenty time units for simplicity of discussion. Each of the five adsorption vessels 10, 20, 30, 40, and 50 follow the same sequence of steps, however, each vessel's sequence of steps are offset from the other vessels.

The PSA cycle depicted in FIG. 3 has several notable differences from the PSA cycle depicted in FIG. 1. For example, the PSA cycle depicted in FIG. 3 advantageously places both the first stage pressure equalization step (E1D) where pressure in the vessel is decreasing and the second stage pressure equalization step (E2D) where pressure in the vessel is decreasing, before the cocurrent depressurization step (PP). In the PSA cycle depicted in FIG. 1 the cocurrent depressurization step (PP) was performed after the first stage pressure equalization step (E1D) and before the second stage pressure equalization step (E2D). Additionally, the PSA cycle depicted in FIG. 3 includes several holding steps (H) in which the vessels are closed such that fluid does not flow into or out of the vessel. The hold states incorporated into the PSA cycle allow the PSA system 1B to be constructed with only one equalization conduit.

Note that if any one of the vessels or valves associated therewith fails in the PSA system 1B depicted in FIG. 4, then the PSA system 1B can be operated as if it were a four vessel system using the PSA cycle depicted in FIG. 1 by isolating the inactive vessel. In fact, the PSA system can then remain active in a four vessel PSA mode until the problem is fixed albeit at a reduced performance. This advantageously allows optimal scheduling of maintenance tasks and a minimization of system down time.

The following is a description of the cycle of adsorption vessel 10 in the PSA cycle depicted in FIG. 3.

During time unit 1, valves 10A, 10B, 10D, and 10E are in the closed state and valves 10C and 30C are in an open state to allow the pressures within vessels 10 and 30 to equalize. During time unit 1, the vessel 10 performs a first stage pressure equalization step (E1D) ere pressure in the vessel 10 is decreasing and simultaneously the vessel 30 performs a first stage pressure equalization step (E1P) where pressure in the vessel 30 is increasing. During time unit 1, fluid from within vessel 10 flows out opening 14 and along conduit 16 to the equalization conduit 106, and then along conduit 36 and into the vessel 30 through opening 34.

During time unit 2, valves 10C and 30C are in a closed state and valves 10D and 40D are in an open state such that vessel 10 supplies fluid to vessel 40, in order to allow the pressures within vessels 10 and 40 to equalize. During time unit 2, the vessel 10 performs a second stage pressure equalization step (E2D) where pressure in the vessel 10 is decreasing, and simultaneously the vessel 40 performs a second stage pressure equalization step (E2P) where pressure in the vessel 40 is increasing. Note that during time unit 2, the second pressure equalization step is performed using valves 10D and 40D, which can provide a different flow rate than valves 10C and 40C. Therefore, during time unit 2, fluid from within vessel 10 flows out opening 14 and along conduit 18 to the equalization conduit 106, and then along conduit 48 and into the vessel 40 through opening 44.

During time units 3 and 4 valves 10D and 50D (or valve 50C) are in an open state. During time units 3 and 4, the vessel 10 performs a cocurrent depressurization step (PP) by providing purge gas to vessel 50, which purges (P) waste by opening valve 50E and thereby discharging the waste from vessel 50 to waste manifold 104 via conduit 53. During time units 3 and 4, fluid from within vessel 10 flows out opening 14 and along conduit 16 to the equalization conduit 106, and then along conduit 56 and into the vessel 50 through opening 54. The vessel 50 is purged by fluid exiting though opening 52 and traveling along conduit 53 to the waste manifold 104.

During time unit 5, the valve 10D is in a closed state and the valve 10E is in an open slate. During time unit 5, the vessel 10 performs a countercurrent blowdown step (BD) in which fluid from within the vessel 10 exits through opening 12 and travels along conduit 13 to the waste manifold 104.

During time unit 6, the vessel 10 is in a holding state wherein all of the valves 10A, 10B, 10C, 10D, and 10B are in a closed state and no fluid travels into or out of the vessel 10 via openings 12 and 14.

During time units 7 and 8, the valve 10E is in the open state and valves 10D and 20D (or 10C and 20C, depending on the desired flow rate) are in the open state. During time units 7 and 8, the vessel 20 performs a cocurrent depressurization (PP) by providing purge gas to vessel 10, which purges (P) waste through opening valve 10E and thereby discharging the waste from vessel 10 to waste manifold 104 via conduit 13. During time units 7 and 8, fluid from within vessel 20 flows out opening 24 and along conduit 28 to the equalization conduit 106, and then along conduit 18 and into the vessel 10 through opening 14. The vessel 10 is purged by fluid exiting through opening 12 and traveling along conduit 13 to the waste manifold 104.

During time unit 9, the vessel 10 is in a holding state, wherein all of the valves 10A, 10B, 10C, 10D, and 10E are in a closed state and no fluid travels into or out of the vessel 10 via openings 12 and 14.

During time unit 10, valves 10D and 30D are in an open state in order to allow the pressures within vessels 10 and 30 to equalize. During time unit 10, the vessel 30 performs a second stage pressure equalization step (E2D) where pressure in the vessel 30 is decreasing, and simultaneously the vessel 10 performs a second stage pressure equalization step (E2P) where pressure in the vessel 10 is increasing. During time unit 10, the second pressure equalization step is performed using valves 10D and 30D. Therefore, during time unit 10, fluid from within vessel 30 flows out opening 34 and along conduit 38 to the equalization conduit 106, and then along conduit 18 and into the vessel 10 through opening 14.

During time units 11 and 12, the vessel 10 is in a holding state, wherein all of the valves 10A, 10B, 10C, 10D, and 10E are in a closed state and no fluid travels into or out of the vessel 10 via openings 12 and 14.

During time unit 13, valves 10C and 40C are in an open state to allow the pressures within vessels 10 and 40 to equalize. During time unit 13, the vessel 40 performs a first stage pressure equalization step (E1D) where pressure in the vessel 40 is decreasing, and simultaneously the vessel 10 performs a first stage pressure equalization step (E1P) where pressure in the vessel 10 is increasing. During time unit 13, fluid from within vessel 40 flows out opening 44 and along conduit 46 to the equalization conduit 106, and then along conduit 16 and into the vessel 10 through opening 14.

During time units 14 through 16, valve 10C is in a closed state, and valve 10B is in an open state to perform a final product repressurization step (FP) in vessel 10. During the final product repressurization step (FP), fluid flows from the vessel 50, which is currently performing the adsorption step, to the product manifold 102 via conduit, and then from the product manifold 102 along conduit 15 and through opening 14 into vessel 10.

During time unit 17, adsorption vessel 10 is performing an adsorption process (A) with valves 10A and 10B in an open state and valves 10C, 10D, 10E, 20A, 30A, 40A, 50A, 20B, 30B, 40B, and 50B in a closed state. During time unit 17, feed gas mixture fluid is being supplied from the source manifold 100 via conduit 11 to the opening 12 of the vessel 10, the fluid is traveling through the adsorption bed within vessel 10, and unadsorbed product fluid is exiting out opening 14 and traveling via conduit 15 to the product manifold 102.

During time units 18 through 20, valves 10A and 10B remain in the open state such that adsorption vessel 10 continues to perform the adsorption process (A), and valve 20B is moved into an open state to perform a final product repressurization step (FP) in vessel 20. During the final product repressurization, fluid flows from the product manifold 102 along conduit 25, and through opening 24 into vessel 20.

The remaining adsorption vessels 20, 30, 40, and 50 follow the same sequence of steps, however, each the sequence of steps are offset from the other vessels. The processes for each of the remaining adsorption vessels 20, 30, 40, and 50 are similar to that described above with regards to vessel 10; however, the various steps that require interaction between vessels will be performed using different vessels as specified in the PSA cycle diagram clearly set forth in FIG. 3.

Figure 6:
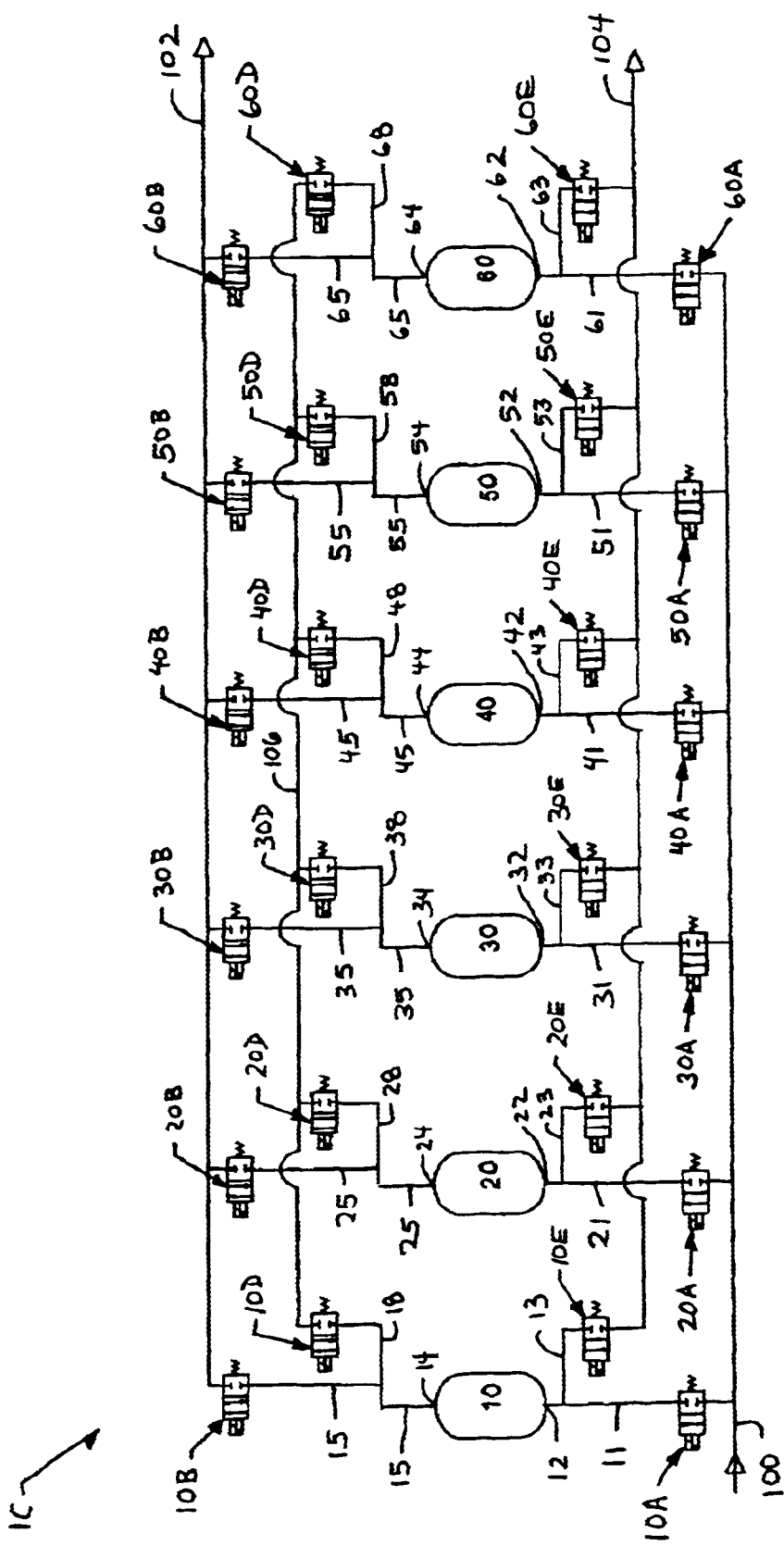
FIG. 6 depicts a valve diagram of an improved PSA system for executing the six vessel PSA cycle of FIG. 5.

FIG. 5 depicts a cycle diagram for a six vessel pressure swing adsorption (PSA) cycle including a three-stage pressure equalization. FIG. 6 depicts a valve diagram of an improved PSA system 1C that can be used to execute the six vessel PSA cycle depicted in FIG. 5.

FIG. 6 depicts a PSA system 1C that includes a first vessel 10, a second vessel 20, a third vessel 30, a fourth vessel 40, and a fifth vessel 50, with corresponding valves and conduits similar to those as described above, which, for purposes of simplicity, will not be described in detail again The PSA system 1C also includes a sixth vessel 60 that includes a bed of adsorption material therein. The vessels 10, 20, 30, 40, 50, and 60 are connected in parallel flow relation between a source manifold 100, which supplies a feed gas mixture, and a product manifold 102, which provides an outlet for unabsorbed product effluent gas. The vessels 10, 20, 30, 40, 50, and 60 are also connected to a waste manifold 104, which provides an outlet for adsorbed components.

The vessel 60 has a lower opening 62 on a lower end thereof that is connected to the source manifold 100 via conduit 61. The conduit 61 has a valve 60A, which controls the flow of fluid between the source manifold 100 and the vessel 60. The lower opening 62 is connected to the waste manifold 104 via conduit 63. The conduit 63 has a valve 60E, which controls the flow of fluid between the waste manifold 104 and the vessel 60. Additionally, the vessel 60 has an upper opening 64 on an upper end thereof, which is connected to the product manifold 102 via conduit 65. The conduit 65 has a valve 60B, which controls the flow of fluid between the product manifold 102 and the vessel 60.

The upper opening 64 can be connected to the equalization conduit 106 by one or more conduits, with each conduit having a valve therein. Preferably, in the six vessel PSA system 1C depicted in FIG. 6, each upper opening 14, 24, 34, 44, 54, and 64 is connected to the equalization conduit 106 via a conduit 18, 28, 38, 48, 58, and 68, respectively. The conduits 18, 28, 38, 48, 58, and 68 have valves 10D, 20D, 30D, 40D, 50D, and 60D, respectively, which control the flow of fluid between the equalization conduit 106 and the vessels 10, 20, 30, 40, 50, and 60, respectively. The valve 10D, 20D, 30D, 40D, 50D, and 60D are configured to operate in the same manner as valves 10C and 10D described about with respect to the four vessel PSA system 1A. Alternatively, the PSA system of the present invention can include plural conduits and valves can be used to connect each vessel with the equalization conduit 106 depending upon the flow characteristics desired in the PSA system.

FIG. 5 depicts a cycle diagram for a six vessel pressure swing adsorption (PSA) cycle including a three-stage pressure equalization that can be executed by the PSA system 1C depicted in FIG. 6. The PSA cycle depicted in FIG. 5 has been divided into twenty-four time units for simplicity of discussion. Each of the six adsorption vessels 10, 20, 30, 40, 50, and 60 follow the same sequence of steps, however, each vessel's sequence of steps are offset from the other vessels.

The PSA cycle depicted in FIG. 5 has several notable differences from the PSA cycle depicted in FIG. 3. More specifically, the PSA cycle depicted in FIG. 5 advantageously utilizes a three-stage pressure equalization in order to minimize fluid shock within the system generally, and the adsorption beds specifically, thereby increasing the life of the adsorbent materials Based upon the PSA cycle in FIG. 5, it is not necessary to include a second valve connecting each vessel to the equalization conduit 106, which further reduces the complexity of the PSA system 1C. The hold states incorporated into the PSA cycle allow the PSA system 1C to be constructed with only one equalization conduit.

Note that if any one or more of the vessels or valves associated therewith fails in the PSA system 1C depicted in FIG. 6, then the PSA system 1C can be operated as if it were a four vessel system using the PSA cycle depicted in FIG. 1 or a five vessel system using the PSA cycle depicted in FIG. 3 by isolating the inactive vessel(s). In fact, the PSA system can then remain active in a four vessel PSA mode or a five vessel PSA mode until the problem can be fixed. However, note that in order to most efficiently perform the PSA cycles in FIGS. 1 and 3, then PSA system 1C would have to be provided with additional valves 10C, 20C, 30C, 40C, 50C, and 60C, which connect the vessels 10, 20, 30, 40, 50, and 60, respectively, to the equalization conduit 106. Alternatively, the PSA cycles in FIGS. 1 and 3 can be performed with PSA system 1C by merely performing all of the equalization steps through the existing valves 10D, 20D, 30D, 40D, 50D, and 60D.

The following is a description of the cycle of adsorption vessel 10 in the PSA cycle depicted in FIG. 5.

During time units 1 through 3, adsorption vessel 10 is performing an adsorption process (A) with valves 10A and 10B in an open state and valves 10D, 10E, 20A, 30A, 40A, 50A, 60A, 20B. 30B, 40B, 50B, and 60B in a closed state.

During time units 1 through 3, feed gas mixture fluid is being supplied from the source manifold 100 via conduit 11 to the opening 12 of the vessel 10, the fluid is traveling through the adsorption bed within vessel 10, and unadsorbed product fluid is exiting out opening 14 and traveling via conduit 15 to the product manifold 102.

During time unit 4, valves 10A and 10B remain in the open state such that adsorption vessel 10 continues to perform the adsorption process (A), and valve 20D is moved into an open state to perform a final product repressurization step (FP) in vessel 20. During the final product repressurization, fluid flows from the product manifold 102 along conduit 25, and through opening 24 into vessel 20.

During time units 5 and 6, adsorption vessel 10 continues to perform an adsorption process (A) with valves 10A and 10B in an open state and valve 20B is moved into a closed state. During time units 5 and 6, feed gas mixture fluid is being supplied from the source manifold 100 via conduit 11 to the opening 12 of the vessel 10, the fluid is traveling through the adsorption bed within vessel 10, and unadsorbed product fluid is exiting out opening 14 and traveling via conduit 15 to the product manifold 102.

During time unit 7, valves 10A, 10B, and 10E are in the closed state and valves 10D and 30D are in an open state to allow the pressures within vessels 10 and 30 to equalize. During time unit 7, the vessel 10 performs a first stage pressure equalization step (E1D) where pressure in the vessel 10 is decreasing, and simultaneously the vessel 30 performs a first stage pressure equalization step (E1P) where pressure in the vessel 30 is increasing. During time unit 7, fluid from within vessel 10 flows out opening 14 and along conduit 18 to the equalization conduit 106, and then along conduit 38 and into the vessel 30 through opening 34.

During time unit 8, valve 30D is in a closed stale and valves 10D and 40D are in an open state such that vessel 10 supplies fluid to vessel 40, in order to allow the pressures within vessels 10 and 40 to equalize. During time unit 8, the vessel 10 performs a second stage pressure equalization step (E2D) where pressure in the vessel 10 is decreasing, and simultaneously the vessel 40 performs a second stage pressure equalization step (E2P) where pressure in the vessel 40 is increasing. Therefore, during time unit 8, fluid from within vessel 10 flows out opening 14 and along conduit 18 to the equalization conduit 106, and then along conduit 48 and into the vessel 40 through opening 44.

During time unit 9, valve 40D is in a closed state and valves 10D and 50D are in an open state such that vessel 10 supplies fluid to vessel 50, in order to allow the pressures within vessels 10 and 50 to equalize. During time unit 9, the vessel 10 performs a third stage pressure equalization step (E3D) where pressure in the vessel 10 is decreasing, and simultaneously the vessel 50 performs a third stage pressure equalization step (E3P) where pressure in the vessel 50 is increasing. Therefore, during time unit 9, fluid from within vessel 10 flows out opening 14 and along conduit 18 to the equalization conduit 106, and then along conduit 58 and into the vessel 50 through opening 54.

During time unit 10, valve 50D is in a closed state and valves 10D and 60D are in an open state. During time unit 10, the vessel 10 performs a cocurrent depressurization step (PP) by providing purge gas to vessel 60, which purges (P) waste by opening valve 60E and thereby discharging the waste from vessel 60 to waste manifold 104 via conduit 63. During time unit 10, fluid from within vessel 10 flows out opening 14 and along conduit 18 to the equalization conduit 106, and then along conduit 68 and into the vessel 60 through opening 64. The vessel 60 is purged by fluid exiting through opening 62 and traveling along conduit 63 to the waste manifold 104.

During time unit 11, the valve 10D is in a closed state and the valve 10E is in an open state. During time unit 11, the vessel 10 performs a countercurrent blowdown step (BD) in which fluid from within the vessel 10 exits through opening 12 and travels along conduit 13 to the waste manifold 104.

During time units 12 and 13, the vessel 10 is in a holding state, wherein all of the valves 10A, 10B, 10D, and 10E are in a closed state and no fluid travels into or out of the vessel 10 via openings 12 and 14.

During time unit 14, the valve 10E is in the open state and valves 10D and 20D are in the open state. During time unit 14, the vessel 20 performs a cocurrent depressurization (PP) by providing purge gas to vessel 10, which purges (P) waste through opening valve 10E and thereby discharging the waste from vessel 10 to waste manifold 104 via conduit 13. During time unit 14, fluid from within vessel 20 flows out opening 24 and along conduit 28 to the equalization conduit 106, and then along conduit 18 and into the vessel 10 through opening 14. The vessel 10 is purged by fluid exiting through opening 12 and traveling along conduit 13 to the waste manifold 104.

During time units 1 and 16, the vessel 10 is in a holding state, wherein all of the valves 10A, 10B, 10D, and 10E arc in a closed state and no fluid travels into or out of the vessel 10 via openings 12 and 14.

During time unit 17, valves 10D and 30D are in an open state in order to allow the pressures within vessels 10 and 30 to equalize. During time unit 17, the vessel 30 performs a third stage pressure equalization step (E3D) where pressure in the vessel 30 is decreasing, and simultaneously the vessel 10 performs a third stage pressure equalization step (E3P) where pressure in the vessel 10 is increasing During time unit 17, the third pressure equalization step is performed using valves 10D and 30D. Therefore, during time unit 17, fluid from within vessel 30 flows out opening 34 and along conduit 38 to the equalization conduit 106, and then along conduit 18 and into the vessel 10 through opening 14.

During time units 18 and 19, the vessel 10 is in a holding state wherein all of the valves 10A, 10B, 10D, and 10E are in a closed state and no fluid travels into or out of the vessel 10 via openings 12 and 14.

During time unit 20, valves 10D and 40D are in an open state in order to allow the pressures within vessels 10 and 40 to equalize. During time unit 20, the vessel 40 performs a second stage presume equalization step (E2D) where pressure in the vessel 40 is decreasing, and simultaneously the vessel 10 performs a second stage pressure equalization step (E2P) where pressure in the vessel 10 is increasing During time unit 20, the second pressure equalization step is performed using valves 10D and 40D. Therefore, during time unit 10, fluid from within vessel 40 flows out opening 44 and along conduit 48 to the equalization conduit 106, and then along conduit 18 and into the vessel 10 through opening 14.

During time units 21 and 22, the vessel 10 is in a holding state, wherein all of the valves 10A, 10B, 10D, and 10E are in a closed state and no fluid travels into or out of the vessel 10 via openings 12 and 14.

During time unit 23, valves 10D and 50D are in an open state to allow the pressures within vessels 10 and 50 to equalize. During time unit 23, the vessel 50 performs a first stage pressure equalization step (E1D) where pressure in the vessel 50 is decreasing, and simultaneously the vessel 10 performs a first stage pressure equalization step (E1P) where pressure in the vessel 10 is increasing. During time unit 23, fluid from within vessel 50 flows out opening 54 and along conduit 58 to the equalization conduit 106, and then along conduit 18 and into the vessel 10 through opening 14.

During time unit 24, valve 10D is in a closed state, and valve 10B is in an open state to perform a final product repressurization step (FP) in vessel 10. During the final product repressurization step (FP), fluid flows from the vessel 60, which is currently performing the adsorption step, to the product manifold 102 via conduit, and then from the product manifold 102 along conduit 15 and through opening 14 into vessel 10.

The remaining adsorption vessels 20, 30, 40, 50, and 60 follow the same sequence of steps, however, each the sequence of steps arc offset from the other vessels. The processes for each of the remaining adsorption vessels 20, 30, 40, 50, and 60 are similar to that described above with regards to vessel 10; however, the various steps that require interaction between vessels will be performed using different vessels as specified in the PSA cycle diagram clearly set forth in FIG. 5.

Figure 8:
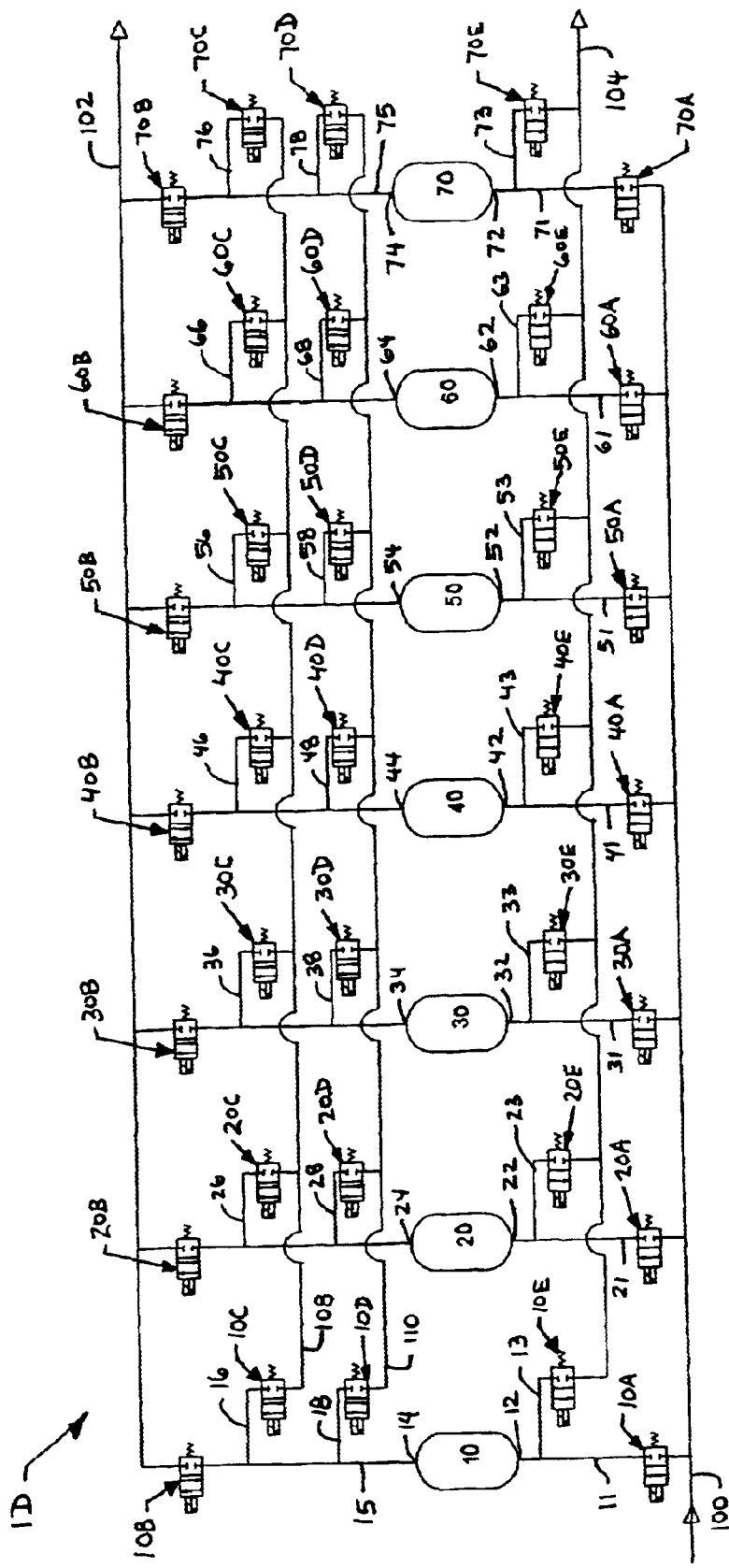
FIG. 8 depicts a valve diagram of an improved PSA system for executing the seven vessel PSA cycle of FIG. 7.

FIG. 7 depicts a cycle diagram for a seven vessel pressure swing adsorption (PSA) cycle including a three-stage pressure equalization FIG. 8 depicts a valve diagram of an improved PSA system 1D that can be used to execute the seven vessel PSA cycle depicted in FIG. 7.

FIG. 8 depicts a PSA system 1D that includes a first vessel 10, a second vessel 20, a third vessel 30, a fourth vessel 40, a fifth vessel 50, and a sixth vessel 60, as described above, which, for purposes of simplicity, will not be described in detail again. The PSA system 1D also includes a seventh vessel 70 that includes abed of adsorption material therein. The vessels 10, 20, 30, 40, 50, 60, and 70 are connected in parallel flow relation between a source manifold 100, which supplies a feed gas mixture, and a product manifold 102, which provides an outlet for unabsorbed product effluent gas. The vessels 10, 20, 30, 40, 50, 60, and 70 are also connected to a waste manifold 104, which provides an outlet for adsorbed components.

The vessel 70 has a lower opening 72 on a lower end thereof that is connected to the source manifold 100 via conduit 71. The conduit 71 has a valve 70A, which controls the flow of fluid between the source manifold 100 and the vessel 70. The lower opening 72 is connected to the waste manifold 104 via conduit 73. The conduit 73 has a valve 70E, which controls the flow of fluid between the waste manifold 104 and the vessel 70. Additionally, the vessel 70 has an upper opening 74 on an upper end thereof, which is connected to the product manifold 102 via conduit 75. The conduit 75 has a valve 70B, which controls the flow of fluid between the product manifold 102 and the vessel 70.

The preferred embodiment of the seven vessel PSA system 1D includes a first equalization conduit 108 and a second equalization conduit 110. The upper openings 14, 24, 34, 44, 54, 64, and 74, can be connected to each of the equalization conduits 108 and 110 by one or more conduits with each conduit having a valve therein. Preferably, the upper openings 14, 24, 34, 44, 54, 64, and 74 are connected to the first equalization conduit 108 via first conduits 16, 26, 36, 46, 56, 66, and 76, respectively. The fist conduits 16, 26, 36, 46, 56, 66, and 76 have valves 10C, 20C, 30C, 40C, 50C, 60C, and 70C, respectively, which control the flow of fluid between the first equalization conduit 108 and the vessels 10, 20, 30, 40, 50, 60, and 70, respectively. Preferably, the upper openings 14, 24, 34, 44, 54, 64, and 74 are connected to the second equalization conduit 110 via second conduits 18, 28, 38, 48, 58, 68, and 78, respectively. The second conduits 18, 28, 38, 48, 58, 68, and 78 have valves 10D, 20D, 30D, 40D, 50D, 60D, and 70D, respectively, which control the flow of fluid between the second equalization conduit 110 and the vessels 10, 20, 30, 40, 50, 60, and 70, respectively. The valves 70C and 70D are configured to operate in the same manner as valves 10C and 10D described about with respect to the four vessel PSA system 1A. Alternatively, the PSA system of the present invention can include plural conduits and valves connecting each vessel with each equalization conduit 108 and 110 depending upon the flow characteristics desired in the PSA system.

FIG. 7 depicts a cycle diagram for a seven vessel pressure swing adsorption (PSA) cycle including a three-stage pressure equalization that can be executed by the PSA system 1D depicted in FIG. 8. The PSA cycle depicted in FIG. 7 has been divided into twenty-one time units for simplicity of discussion. Each of the seven adsorption vessels 10, 20, 30, 40, 50, 60, and 70 follow the same sequence of steps, however, each vessel's sequence of steps are offset from the other vessels.

The PSA cycle depicted in FIG. 7 advantageously utilizes a three-stage pressure equalization in order to minimize fluid shock within the system generally, and the adsorption beds specifically, thereby increasing the life of the adsorbent materials. Based upon the PSA cycle in FIG. 7, it is not necessary to include a second valve connecting each vessel to an equalization conduit, which reduces the complexity of the PSA system 1D. The PSA system 1D includes two separate equalization conduits 108 and 110, which allows the PSA cycle of FIG. 7 to not include any hold states and generally increase the time allotted for the adsorption step in each vessel.

Note that if any one or more of the vessels or valves associated therewith fails in the PSA system 1D depicted in FIG. 8, then the PSA system 1D can be operated as if it were a four vessel system using the PSA cycle depicted in FIG. 1, a five vessel system using the PSA cycle depicted in FIG. 3, or a six vessel system using the PSA cycle depicted in FIG. 5 by isolating the inactive vessel(s). In fact, the PSA system can then remain active in a four vessel PSA mode, a five vessel PSA mode, or a six vessel PSA mode until the problem is fixed.

The following is a description of the cycle of adsorption vessel 10 in the PSA cycle depicted in FIG. 7.

During time unit 1, adsorption vessel 10 is performing an adsorption process (A) with valves 10A and 10B in an open state and valves 10C, 10D, 10E, 20A, 30A, 40A, 50A, 60A, 20B. 30B, 40B, 50B, and 60B in a closed state. During time unit 1, feed gas mixture fluid is being supplied from the source manifold 100 via conduit 11 to the opening 12 of the vessel 10, the fluid is traveling though the adsorption bed within vessel 10, and unadsorbed product fluid is exiting out opening 14 and traveling via conduit 15 to the product manifold 102. It should be noted that vessel 70 is also performing an adsorption step at this time, and that valves 70A and 70B are also open.

During time units 2 and 3, valves 10A, 10B, 70A and 70B remain in the open state such that adsorption vessels 10 and 70 continue to perform the adsorption process (A), and valve 20B is moved into an open state to perform a final product repressurization step (FP) in vessel 20. During the final product repressurization, fluid flows from the product manifold 102 along conduit 25, and through opening 24 into vessel 20.

During time units 4 through 6, adsorption vessel 10 continues to perform an adsorption process (A) with valves 10A and 10B in an open state and valve 20B is moved into a closed state. Vessel 70 ceases its adsorption step and valves 70A and 70B close. During time units 5 and 6, feed gas mixture fluid is being supplied from the source manifold 100 via conduit 11 to the opening 12 of the vessel 10, the fluid is traveling through the adsorption bed within vessel 10, and unadsorbed product fluid is exiting out opening 14 and traveling via conduit 15 to the product manifold 102.

During time unit 7, valves 10A, 10B, 10D, and 10E are in the closed state and valves 10C and 40C are in an open state to allow the pressures within vessels 10 and 40 to equalize. During time unit 7, the vessel 10 performs a first stage pressure equalization step (E1D) where pressure in the vessel 10 is decreasing, and simultaneously the vessel 40 performs a first stage pressure equalization step (E1P) where pressure in the vessel 40 is increasing. During time unit 7, fluid from within vessel 10 flows out opening 14 and along conduit 16 to the equalization conduit 108, and then along conduit 46 and into the vessel 40 through opening 44. Note that this step can alternatively be performed along equalization conduit 110 using valves 10 and 40D, if desired.

During time units 8 and 9, valve 40C is in a closed state and valves 10C and 50C are in an open state such that vessel 10 supplies fluid to vessel 50, in order to allow the pressures within vessels 10 and 50 to equalize. During time units 8 and 9, the vessel 10 performs a second stage pressure equalization step (E2D) where pressure in the vessel 10 is decreasing, and simultaneously the vessel 50 performs a second stage pressure equalization step (E2P) where pressure in the vessel 50 is increasing. Therefore, during time units 8 and 9, fluid from within vessel 10 flows out opening 14 and along conduit 16 to the equalization conduit 108, and then along conduit 56 and into the vessel 50 through opening 54. Note that this step can alternatively be performed along equalization conduit 110 using valves 10D and 50D, if desired.

During time unit 10, valve 10C is in a closed state and valves 10D and 60D are in an open state such that vessel 10 supplies fluid to vessel 60, in order to allow the pressures within vessels 10 and 60 to equalize. During time unit 10, the vessel 10 performs a third stage pressure equalization step (E3D) where pressure in the vessel 10 is decreasing, and simultaneously the vessel 60 performs a third stage pressure equalization step (E3P) where pressure in the vessel 60 is increasing. Therefore, during time unit 10, fluid from within vessel 10 flows out opening 14 and along conduit 18 to the equalization conduit 110, and then along conduit 68 and into the vessel 60 though opening 64. Note that this step can alternatively be performed along equalization conduit 108 using valves 10C and 60C, if desired.

During time units 11 and 12, valve 60D is in a closed state and valves 10D and 70D are in an open state. During time units 11 and 12, the vessel 10 performs a cocurrent depressurization step (PP) by providing purge gas to vessel 70, which purges (P) waste by opening valve 70E and thereby discharging the waste from vessel 70 to waste manifold 104 via conduit 73. During time units 11 and 12, fluid from within vessel 10 flows out opening 14 and along conduit 18 to the equalization conduit 110, and then along conduit 78 and into the vessel 70 through opening 74. The vessel 70 is purged by fluid exiting through opening 72 and traveling along conduit 73 to the waste manifold 104. Note that this step can alternatively be performed along equalization conduit 108 using valves 10C and 70C, if desired.

During time unit 13, the valve 10D is in a closed state and the valve 10E is in an open state. During time unit 13, the vessel 10 performs a countercurrent blowdown step (BD) in which fluid from within the vessel 10 exits through opening 12 and travels along conduit 13 to the waste manifold 104.

During time units 14 and 15, the valve 10E is in the open state and valves 10D and 20D are in the open state. During time units 14 and 15, the vessel 20 performs a cocurrent depressurization (PP) by providing purge gas to vessel 10, which purges (P) waste through opening valve 10E and thereby discharging the waste from vessel 10 to waste manifold 104 via conduit 13. During time units 14 and 15, fluid from within vessel 20 flows out opening 24 and along conduit 28 to the equalization conduit 110, and then along conduit 18 and into the vessel 10 through opening 14. The vessel 10 is purged by fluid exiting through opening 12 and traveling along conduit 13 to the waste manifold 104. Note that this step can alternatively be performed along equalization conduit 108 using valves 10C and 20C, if desired.

During time unit 16, valves 10D and 30D are in an open state in order to allow the pressures within vessels 10 and 30 to equalize. During time unit 16, the vessel 30 performs a third stage pressure equalization step (E3D) where pressure in the vessel 30 is decreasing, and simultaneously the vessel 10 performs a third stage pressure equalization step (E3P) where pressure in the vessel 10 is increasing During time unit 16, the third pressure equalization step is performed using valves 10D and 30D. Therefore, during lime unit 16, fluid from within vessel 30 flows out opening 34 and along conduit 38 to the equalization conduit 110, and then along conduit 18 and into the vessel 10 through opening 14. Note that this step can alternatively be performed along equalization conduit 108 using valves 10C and 30C, if desired.

During time units 17 and 18, valve 10D is in the closed state and valves 10C and 40C are in an open state in order to allow the pressures within vessels 10 and 40 to equalize. During time units 17 and 18, the vessel 40 performs a second stage pressure equalization step (E2D) where pressure in the vessel 40 is decreasing, and simultaneously the vessel 10 performs a second stage pressure equalization step (E2P) where pressure in the vessel 10 is increasing. During time units 17 and 18, the second pressure equalization step is performed using valves 10C and 40C. Therefore, during time units 17 and 18, fluid from within vessel 40 flows out opening 44 and along conduit 46lo the equalization conduit 108, and then along conduit 16 and into the vessel 10 through opening 14. Note that this step can alternatively be performed along equalization conduit 110 using valves 10D and 40D, if desired.

During time unit 19, valve 40C is in the closed state and valves 10C and 50C are in an open state to allow the pressures within vessels 10 and 50 to equalize. During time unit 19, the vessel 50 performs a first stage pressure equalization step (E1D) where pressure in the vessel 50 is decreasing, and simultaneously the vessel 10 performs a first stage pressure equalization step (E1P) where pressure in the vessel 10 is increasing, During time unit 19, fluid from within vessel 50 flows out opening 54 and along conduit 56 to the equalization conduit 108, and then along conduit 18 and into the vessel 10 through opening 14. Note that this step can alternatively be performed along equalization conduit 110 using valves 10D and 50D, if desired.

During time units 20 and 21, valves 10C and 50C are in a closed state, and valve 10B is in an open state to perform a final product repressurization step (FP) in vessel 10. During the final product repressurization step (FP), fluid flows from the vessels 60 and 70, which are currently performing the adsorption step, to the product manifold 102 via conduits 65 and 75, and then from the product manifold 102 along conduit IS and through opening 14 into vessel 10.

The remaining adsorption vessels 20, 30, 40, 50, 60, and 70 follow the same sequence of steps, however, each the sequence of steps are offset from the other vessels. The processes for each of the remaining adsorption vessels 20, 30, 40, 50, 60, and 70 are similar to that described above with regards to vessel 10; however, the various steps that require interaction between vessels will be performed using different vessels as specified in the PSA cycle diagram clearly set forth in FIG. 7.

Figure 9:
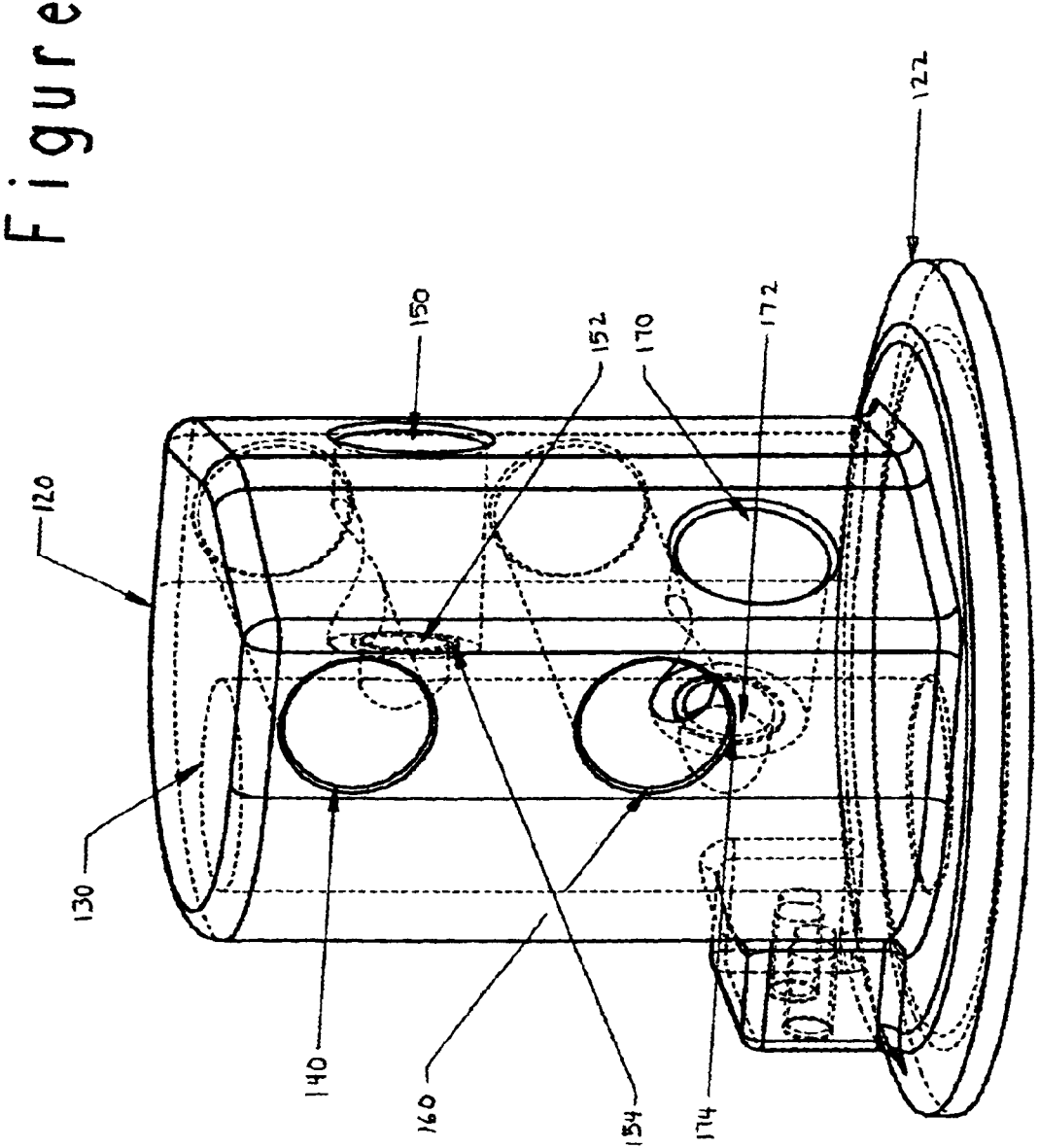
FIG. 9 depicts a valve manifold for use with the present invention with hidden features denoted by dashed lines

The present invention advantageously provides a PSA system having a structure that is not complex and that is capable of performing two, three, or more stages of pressure equalization in order to reduce fluid shock within the system. Fluid shock can decrease the life of the absorbent by causing the absorbent grains within the adsorbent bed to move and rub against one another, thereby breaking the grains down into smaller and smaller granules and creating an adsorbent sludge. The PSA systems A, 1B, 1C,and 1D can be constructed in many different manners using many different configurations of fittings and valves. One preferred configuration of a valve manifold that can be used with the present invention is depicted in FIG. 9, which is disclosed in an application entitled METHOD AND APPARATUS FOR PRESSURE SWING ADSORPTION by inventor Franklin D. Lomax, Jr. et al. filed concurrently herewith that is based upon Provisional Application Ser. No. 60/370,702, entitled IMPROVED METHOD AND APPARATUS FOR PRESSURE SWING ADSORPTION, which was filed on Apr. 9, 2002. The contents of those applications are incorporated herein by reference.

FIG. 9 depicts a three-dimensional, perspective view of the valve manifold 120 that can be utilized with the present invention. The valve manifold 120 depicted in FIG. 9 can be utilized by attachment of base 122 to a lower end of the vessel 10 of FIG. 2. The valve manifold 120 is provided with at least one plenum cavity 130, which can be provided in communication with adsorbent vessel 10 (see FIG. 2) via opening 12. The plenum cavity 130 is conduit 11 depicted in FIG. 2. The manifold 120 is further provided with a first fluid channel 140 that forms a part of source manifold 100, when fluid channel 140 is connected via conduits to the same feature in the valve manifolds of vessels 20, 30, and 40. The manifold 120 also includes a second fluid channel 160 that forms a part of waste manifold 104, when fluid channel 160 is connected via conduits to the same feature in the valve manifolds of vessels 20, 30, and 40.

The plenum cavity 130 is in communication with the first fluid channel 140 via an internal gallery or fluid passage 152. The fluid passage 152 is the conduit 11 depicted in FIG. 2. A valve (not depicted in FIG. 9, but is depicted as valve 10A in FIG. 2) is mounted within a port 130 against a valve seat 154 such that the valve can control the flow of fluid from the plenum cavity 130 to the first fluid channel 140 via the fluid passage 152. The plenum cavity 130 is in communication with the second fluid channel 160 via an internal gallery or fluid passage 172. The fluid passage 172 is the conduit 13 depicted in FIG. 2. A valve (not depicted in FIG. 9, but is depicted as valve 10E in FIG. 2) is mounted within a port 170 against a valve seat 174 such that the valve can control the flow of fluid from the plenum cavity 130 to the second fluid channel 160 via the fluid passage 172.

The valve manifold 120 provides a compact structure that has a minimal number of fittings, which therefore reduces the size of the PSA system and reduces the chances for leaks.

The valve manifold can be provided with additional fluid channels or additional valves connecting the plenum cavity to the fluid channel via additional fluid passages, as needed in a particular PSA system. For example, a valve manifold similar to that depicted in FIG. 9 can be utilized on an upper end of the vessel 10 at opening 14. However, an additional valve port, valve seat, and fluid passage would have to be provided within the manifold and connected to one of the fluid channels in order to provide a port for an additional valve since opening 14 is connected to equalization conduit 106 by two valves 10C and 10D via two conduits 16 and 18, respectively. Regarding the upper and of vessel 10 in the PSA system 1D in FIG. 8, an additional fluid channel would need to be added to the valve manifold, since the opening 14 is connected to product manifold 102, equalization conduit 108, and equalization conduit 110.

Note that the valves of the present invention are configured to not restrict flow along the channel and to not restrict flow within the cavities. The valves are configured to merely control the flow of fluid between the cavities and the channels via the passages. Accordingly, if any given valve fails, then the flow along the channel and the flow within the cavity can be maintained if desired.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than a specifically described herein.

What is claimed as new and desired to be secured by Letters Patent of the United States is:

1. A pressure swing adsorption process comprising the step of:
    separating a gas mixture by absorbing at least one gas component in adsorbent beds provided within a plurality of vessels,
    wherein the separating step has at least a two-stage pressure equalization and a purge step, and
    wherein the separating step is performed with no more than five valves per vessel of the plurality of vessels.
2. The process according to claim 1, wherein the
    at least two-stage pressure equalization is further defined as at least a three-stage pressure equalization.
3. The process according to claim 1, further comprising the step of providing a first equalization conduit that connects each vessel of the plurality of vessels.
4. The process according to claim 3, wherein the at least two-stage pressure equalization and the purge step occur via the first equalization conduit.
5. The process according to claim 3, further comprising the step of providing a first valve of the no more than five valves per vessel that fluidly connects the fiat equalization conduit to a first vessel of the plurality of vessels and does not prevent flow along the first equalization conduit to any remaining vessels of the plurality of vessels.
6. The process according to claim 5, further comprising the step of providing a second equalization conduit that connects each vessel of the plurality of vessels, wherein the at least two-stage pressure equalization and purge step occur via the first equalization conduit and the second equalization conduit.
7. The process according to claim 6, further comprising the step of providing a second valve of the no more than five valves per vessel that fluidly connects the second equalization conduit to the first vessel of the plurality of vessels and does not prevent flow along the second equalization conduit to any remaining vessels of the plurality of vessels.
8. The process according to claim 7, wherein the first valve provides a first predetermined flow rate when in an open state, and wherein the second valve provides a second predetermined flow rate when in an open state.
9. The process according to claim 8, wherein the first predetermined flow rate is different from the second predetermined flow rate, and wherein the first valve is in the open state during a first stage of the two-stage pressure equalization and the second valve is in the open state during a second stage of the two-stage pressure equalization.
10. The process according to claim 3, further comprising the steps of:
    providing a first valve of the no more than five valves per vessel that fluidly connects the first equalization conduit to a first vessel of the plurality of vessels and
    providing a second valve of the no more than five valves per vessel that fluidly connects the first equalization conduit to the first vessel of the plurality of vessel.
11. The process according to claim 10, wherein the first valve provides a first predetermined flow rate when in an open state, and wherein the second valve provides a second predetermined flow rate when in an open state.
12. The process according to claim 11, wherein the first predetermined flow rate is different from the second predetermined flow rate, and wherein the first valve is in the open state during a first stage of the two-stage pressure equalization and the second valve is in the open state during a second stage of the two-stage pressure equalization.
13. The process according to claim 1, wherein the plurality of vessels each have:
    a first opening connected to a source inlet manifold via a first valve of the no more than five valves per vessel and connected to a waste outlet manifold via a second valve of the no more than five valves per vessel; and
    a second opening connected to a product outlet manifold via a third valve of the no more than five valves per vessel and connected to an equalization conduit via a fourth valve of the no more than five valves per vessel and a fifth valve of the no more than five valves per vessel, the equalization conduit connecting each vessel of the plurality of vessels.
14. The process according to claim 13, wherein the fourth valve and the fifth valve do not prevent flow along the equalization conduit to any other vessel of the plurality of vessels.
15. The process according to claim 13, wherein the fourth valve provides a first predetermined flow rate when in an open state, and wherein the fifth valve provides a second predetermined flow rate when in an open state.
16. The process according to claim 15, wherein the first predetermined flow rate is different from the second predetermined flow rate, and wherein the fourth valve is in the open state during a first stage of the two-stage pressure equalization and the fifth valve is in the open state during a second stage of the two-stage pressure equalization.
17. A pressure swing adsorption process comprising the step of:
    separating a gas mixture by absorbing at least one gas component in adsorbent beds provided within a plurality of vessels,
    wherein the separating step has at least a two-stage pressure equalization, and wherein the separating step is performed with no more than four valves per vessel of the plurality of vessels.

18. The process according to claim 17, wherein the plurality of vessels includes at least five vessels.

19. The process according to claim 17, wherein the plurality of vessels includes six vessels, and wherein the at least two-stage pressure equalization is further defined as a three-stage pressure equalization.

20. A pressure swing adsorption process comprising the step of:
   separating a gas mixture by absorbing at least one gas component in adsorbent beds provided within seven vessels,
   wherein the separating step has at least a three-stage pressure equalization and is performed with no more than five valves per vessel of the seven vessels.

21. A pressure swing adsorption process for separating a gas mixture by absorbing at least one gas component in adsorbent beds provided within a plurality of vessels, wherein the plurality of vessels are cyclically operated, the process comprising:
   an adsorption step;
   a first pressure equalization step having at least two stages, the first pressure equalization step decreasing pressure;
   a purge step; and
   a second pressure equalization step having at least two stages, the second pressure equalization step increasing pressure,
   wherein said process is performed with no more than five valves per vessel of the plurality of vessels.

22. The process according to claim 21, wherein the at least two stages of the first pressure equalization step is further defined as at least three stages, and wherein the at least two stages of the second pressure equalization step is further defined as at least thee stages.

23. The process according to claim 21, wherein
   the at least two stages of the first pressure equalization step comprise at least two pressure equalization/depressurization stages, and the first pressure equalization step further comprises a cocurrent depressurization step providing purge gas for the purge step; and
   the at least two stages of the second pressure equalization step comprise at least two pressure equalization/repressurization stages, and the second pressure equalization step further comprises a final repressurization step.

24. The process according to claim 23, wherein all pressure equalization/depressurization stages of the first pressure equalization step occur prior to the cocurrent depressurization step.

25. The process according to claim 21, wherein said process further comprises a countercurrent blowdown step prior to the purge step.

26. The process according to claim 21, further comprising the step of providing a first equalization conduit that connects each vessel of the plurality of vessels.

27. The process according to claim 26, wherein both the first pressure equalization step and the second pressure equalization step occur via the first equalization conduit.

28. The process according to claim 27, further comprising the step of providing a first valve of the no more than five valves per vessel that fluidly connects the first equalization conduit to a first vessel of the plurality of vessels and does not prevent flow along the first equalization conduit to any remaining vessels of the plurality of vessels.

29. The process according to claim 28, further comprising the step of providing a second equalization conduit that connects each vessel of the plurality of vessels, wherein the first pressure equalization step and the second pressure equalization step occur via the first equalization conduit and the second equalization conduit.

30. The process according to claim 29, further comprising the step of providing a second valve of the no more than five valves per vessel that fluidly connects the second equalization conduit to the first vessel of the plurality of-vessels and does not prevent flow along the second equalization conduit to any remaining vessels of the plurality of vessels.

31. The process according to claim 30, wherein the first valve provides a first predetermined flow rate when in an open state, wherein the second valve provides a second predetermined flow rate when in an open state, and wherein the first predetermined flow rate is different from the second predetermined flow rate.

32. The process according to claim 21, wherein the plurality of vessels each have:
   a first opening connected to a source inlet manifold via a first valve of the no more than five valves per vessel and connected to a waste outlet manifold via a second valve of the no more than five valves per vessel; and
   a second opening connected to a product outlet manifold via a third valve of the no more than five valves per vessel and connected to an equalization conduit via a fourth valve of the no more than five valves per vessel and a fifth valve of the no more than five valves per vessel, the equalization conduit connecting each vessel of the plurality of vessels.

33. The process according to claim 32, wherein the fourth valve and the fifth valve do not prevent flow along the equalization conduit to any other vessel of the plurality of vessels.

34. The process according to claim 32, wherein the fourth valve provides a first predetermined flow rate when in an open state, wherein the fifth valve provides a second predetermined flow rate when in an open state, and wherein the first predetermined flow rate is different from the second predetermined flow rate.

35. A pressure swing adsorption process for separating a gas mixture by absorbing at least one gas component in adsorbent beds provided within a plurality of vessels, wherein the plurality of vessels are cyclically operated, the process comprising:
   and adsorption step;
   a first pressure equalization step having at least two stages, the first pressure equalization step decreasing pressure;
   a purge step; and
   a second pressure equalization step having at least two stages, the second pressure equalization step increasing pressure,
   wherein said process is performed with no more than four valves per vessel of the plurality of vessels.

36. The process according to claim 35, wherein the plurality of vessels includes at least five vessels.

37. The process according to claim 35, wherein the plurality of vessels includes six vessels, wherein the at least two stages of the first pressure equalization step is further defined as three stages, and wherein the at least two stages of the second pressure equalization step is further defined as three stages.

38. A pressure swing adsorption process for separating a gas mixture by absorbing at least one gas component in adsorbent beds provided within seven vessels, wherein the seven vessels are cyclically operated, the process comprising:
  an adsorption step;
  a first pressure equalization step having three stages, the first pressure equalization step decreasing pressure;
  a purge step; and
  a second pressure equalization step having three stages, the second pressure equalization step increasing pressure,
  wherein said process is performed with no more than five valves per vessel of the seven vessels.

39. The process according to claim 38, further comprising the step of:
  providing a first equalization conduit that connects each vessel of the seven vessels; and
  providing a second equalization conduit that connects each vessel of the seven vessels,
  wherein a first stage of the three stage pressure equalization and the purge step equalization conduit and wherein a second stage and a third stage of the three stage pressure equalization occur via the second equalization conduit.

40. The process according to claim 38, further comprising the step of providing a first equalization conduit and a second equalization conduit both of which are fluidly connected to each of the seven vessels, wherein a first stage and a second stage of the three stage pressure equalization occur via the first equalization conduit and wherein a third stage of the three stage pressure equalization and the purge step occur via the second equalization conduit.

41. A pressure swing adsorption process comprising the steps of:
  separating a gas mixture by absorbing at least one gas component in adsorbent beds provided within a plurality of vessels,
  wherein the separating step is initially performed using a pressure swing adsorption cycle for n vessels, where n is equal to, a number of vessels of said plurality of vessels initially operating to perform the separating step,
  wherein, upon failure of at least one of a specific vessel and a valve directly associated with the specific vessel, the separating step is performed using a pressure swing adsorption cycle for n−1 vessels by bypassing the specific vessel,
  wherein the process is performed using seven vessels, and
  wherein the separating step has a three-stage pressure equalization.

42. The pressure swing adsorption process according to claim 41, wherein the separating step is performed with no more than five valves per vessel.

43. A pressure swing adsorption process for separating a gas mixture by absorbing at least one gas component in adsorbent beds provided within a plurality of vessels, wherein the plurality of vessels are cyclically operated, the process comprising:
  an adsorption step;
  a first pressure equalization step having at least two stages, the first pressure equalization step decreasing pressure;
  a purge step; and
  a second pressure equalization step having at least two stages, the second pressure equalization step increasing pressure,
  wherein the process is initially performed using a pressure swing adsorption cycle for n vessels, where n is equal to a number of vessels of said plurality of vessels initially operating to perform the precess, and
  wherein, upon failure of at least one of a specific vessel and a valve directly associated with the specific vessel, the process is performed using a pressure swing adsorption cycle for n−1 vessels by bypassing the specific vessel,
  wherein the process is performed using seven vessels, and
  wherein the separating step has a three-stage pressure equalization.

44. The pressure swing adsorption process according to claim 43, wherein said process is performed with no more than five valves per vessel.

45. A pressure swing adsorption system, comprising:
  a plurality of vessels each having:
    a first opening connected to a source inlet manifold via a first valve and connected to a waste outlet manifold via a second valve; and
    a second opening connected to a product outlet manifold via a third valve and connected to an equalization conduit via a fourth valve and a fifth valve, said equalization conduit connecting each vessel of said plurality of vessels,
  wherein said pressure swing adsorption system includes no more than five valves per vessel of said plurality of vessels including said first valve, said second valve, said third valve, said fourth valve, and said fifth valve.

46. The pressure swing adsorption system according to claim 45, wherein said fourth valve and said fifth valve do not prevent flow along said equalization conduit to any other vessel of said plurality of vessels.

47. The pressure swing adsorption system according to claim 45, wherein said fourth valve provides a first predetermined flow rate when in an open state, and wherein said fifth valve provides a second predetermined flow rate when in an open state.

48. The pressure swing adsorption system according to claim 47, wherein said first predetermined flow rate is different from said second predetermined flow rate.

49. A pressure swing adsorption system, comprising:
  a plurality of vessels each having:
    a first opening connected to a source inlet manifold via a first valve and connected to a waste outlet manifold via a second valve; and
    a second opening connected to a product outlet manifold via a third valve and connected to an equalization conduit via a fourth valve and a fifth valve, said equalization conduit connecting each vessel of said plurality of vessels,
  wherein said fourth valve provides a first predetermined flow rate when in an open state, and
  wherein said fifth valve provides a second predetermined flow rate when in an open state.

50. The pressure swing adsorption system according to claim 49, wherein said fourth valve and said fifth valve do not prevent flow along said equalization conduit to any other vessel of said plurality of vessels.

51. The pressure swing adsorption system according to claim 49, wherein said first predetermined flow rate is different from said second predetermined flow rate.

52. The pressure swing adsorption system according to claim 49, wherein said pressure swing adsorption system includes no more than five valves per vessel of said plurality of vessels.

53. A pressure swing adsorption system, comprising:
   at least five vessels each having:
      a first opening connected to a source inlet manifold via a first valve and connected to a waste outlet manifold via a second valve; and
      a second opening connected to a product outlet manifold via a third valve and connected to an equalization conduit via a fourth valve, said equalization conduit connecting each vessel,
   wherein said pressure swing adsorption system includes no more than four valves per vessel.

54. The pressure swing adsorption system according to claim 53, wherein said at least five vessels is defined as six vessels.

55. The pressure swing adsorption system according to claim 53, wherein said fourth valve does not prevent flow along said equalization conduit to any other vessel of said at least five vessels.

* * * * *